US006166876A

United States Patent [19]
Liu

[11] Patent Number: 6,166,876
[45] Date of Patent: Dec. 26, 2000

[54] MINIMIZING SETTLING TIME IN A DISC DRIVE SERVO SYSTEM

[75] Inventor: Zhiqiang Liu, Oklahoma City, Okla.

[73] Assignee: Seagate Technology, Inc., Scotts Valley, Calif.

[21] Appl. No.: 09/052,822

[22] Filed: Mar. 31, 1998

Related U.S. Application Data

[60] Provisional application No. 60/075,795, Feb. 24, 1998.

[51] Int. Cl.[7] ........................................ G11B 5/55
[52] U.S. Cl. ...................................... 360/78.04; 360/78.09
[58] Field of Search .............................. 360/78.09, 78.04, 360/78.06, 78.07, 78.14

[56] References Cited

U.S. PATENT DOCUMENTS

| | | |
|---|---|---|
| 4,724,369 | 2/1988 | Hashimoto . |
| 4,791,548 | 12/1988 | Yoshikawa et al. . |
| 4,816,941 | 3/1989 | Edel et al. . |
| 5,126,897 | 6/1992 | Ogawa et al. ........................ 360/78.09 |
| 5,262,907 | 11/1993 | Duffy et al. . |
| 5,307,330 | 4/1994 | Okamura .......................... 360/78.06 X |
| 5,369,345 | 11/1994 | Phan et al. . |
| 5,381,282 | 1/1995 | Arai et al. ............................. 360/78.09 |
| 5,459,624 | 10/1995 | Erickson et al. ................. 360/78.09 X |
| 5,465,183 | 11/1995 | Hattori ................................. 360/78.09 |
| 5,510,939 | 4/1996 | Lewis .................................... 360/78.09 |
| 5,646,797 | 7/1997 | Kadlec et al. . |

OTHER PUBLICATIONS

Yamaguchi et al., "Design of Mode Switching Controller with Initial Value Compensation and its Application to Disk Drive Servo Control," IFAC 13th Triennial World Congress, San Francisco, California, USA, 1996, pp. 471–476.

Yamaguchi et al., "Mode Switching Control Design with Initial Value compensation and Its Application to Head Positioning Control on Magnetic Disk Drives," IEEE Transactions on Industrial Electronics, vol. 43, No. 1, Feb. 1996, pp. 65–73.

*Primary Examiner*—Paul Loomis
*Assistant Examiner*—James L Habermehl
*Attorney, Agent, or Firm*—Crowe & Dunlevy

[57] ABSTRACT

An apparatus and method are disclosed for minimizing settling time in a disc drive servo system. The disc drive includes a head adjacent a rotatable disc on which a plurality of tracks are defined and a motor which controllably positions the head in response to current applied to the motor. A servo circuit is provided to settle the head onto a destination track at the conclusion of a seek operation by determining velocity of the head at a selected distance from the destination track, comparing the velocity to a desired velocity of the head at the selected distance from the destination track, adding a settling gain to a current command signal to generate a modified current command signal in relation to a difference between the velocity and the desired velocity, and using the modified current command signal to settle the head onto the destination track. The addition of the settling gain serves to add an additional zero to the response of the servo circuit, with the placement of the zero preferably determined in relation to a weighting of the locations of the closest two poles of the response.

9 Claims, 6 Drawing Sheets

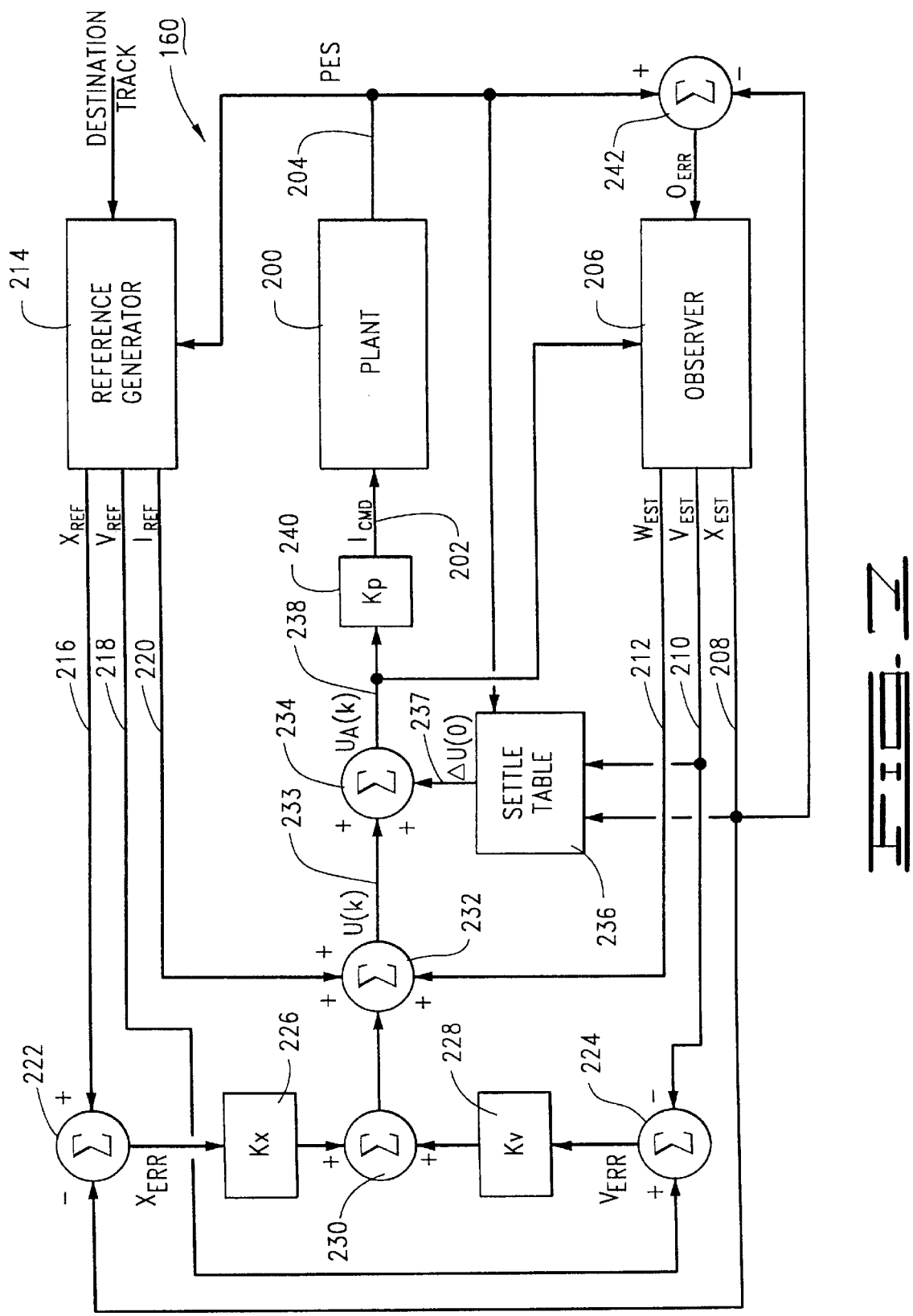

MINIMIZING SETTLING TIME IN A DISC DRIVE SERVO SYSTEM

RELATED APPLICATIONS

This application claims the benefit of United States Provisional Application No. 60/075,795 entitled METHOD FOR DESIGNING ROBUST PROXIMATE MINIMUM TIME SETTLING CONTROLLER, filed Feb. 24, 1998.

FIELD OF THE INVENTION

This invention relates generally to the field of disc drive data storage devices, and more particularly, but not by way of limitation, to reducing the time required to settle a head onto a destination track during a disc drive seek operation through adaptive current compensation.

BACKGROUND

Disc drives are typically used as primary data storage devices in modern computer systems and networks, due to the efficient and cost-effective manner in which large amounts of computerized data can be stored and retrieved. Disc drives of the present generation have data storage capacities measured in excess of several gigabytes (GB) and can be used alone (as in a typical personal computer configuration) or in multi-drive data storage arrays (as with an internet network server or a mainframe computer).

A typical disc drive comprises a plurality of rigid magnetic storage discs which are axially aligned and arranged about a spindle motor for rotation at a constant high speed (such as around 10,000 revolutions per minute). An array of read/write heads are provided to transfer data between tracks of the discs and a host computer in which the disc drive is mounted.

The heads are mounted to a rotary actuator assembly and are controllably positioned adjacent the tracks by a closed loop servo system. More particularly, the actuator assembly includes a coil of a voice coil motor (VCM), so that the servo system controls the position of the heads through the application of current to the coil in response to detected and estimated positions of the heads, as well as command inputs indicating desired positions of the heads.

The servo system primarily operates in one of two selectable modes: seeking and track following. A seek operation entails moving a selected head from an initial track to a destination track on the associated disc surface through the initial acceleration and subsequent deceleration of the head away from the initial track and toward the destination track. A velocity control approach is used whereby the velocity of the head is repeatedly estimated (based on measured position) and compared to a velocity profile defining a desired velocity trajectory for the seek. Corrections to the amount of current applied to the coil during the seek are made in relation to the difference between the estimated velocity and the desired velocity.

At such time that the head reaches a predetermined distance away from the destination track (such as one track away), the servo system transitions to a settling mode wherein the head is settled onto the destination track. Thereafter, the servo system enters a track following mode of operation wherein the head is caused to follow the destination track until the next seek operation is performed.

Disc drive designs thus typically use proximate time optimal control with a velocity profile to control a selected head during a seek, a state estimator based controller with relatively slow integration to settle the head onto the destination track, and the same state estimator based controller with relatively fast integration for track following.

One problem with this approach is that, at such time that control is switched from seek mode to settling mode, an initial velocity variation can cause large overshoot or undershoot of the head relative to the destination track, undesirably extending the time required to settle the head onto the destination track. This velocity variation is inherent in modern disc drive designs because the acceleration constant of the VCM changes with temperature and relative position of the coil. These and other such factors tend to introduce velocity errors during seeks, undesirably extending settling times.

A typical high performance disc drive has a specified seek time of around eight milliseconds (msec), which includes the time necessary for the head to be moved across the surface of the disc and settled onto the destination track (over the track center within a specified tolerance), as well as the latency time required for the desired data sector to reach the head as the disc rotates relative to the head. Significantly, such velocity variations at the beginning of the settling phase can extend the seek time by one to two milliseconds. Because the disc drive is typically unavailable to transfer data between the discs and a host computer during a seek operation, consumer demands for continually improved data transfer performance has led designers to find ways to improve servo control and reduce settling time during seeks.

Several methods have been recently proposed to reduce settling time using a technique generally referred to as initial value compensation. See, for example, an article by Eddy et al. entitled "Bias in Disk Drive Rotary Actuators: Characterization, Prediction and Compensation," IEEE *Transactions on Industrial Electronics*, Vol. 33, No. 3, 1997, pp. 2424–2433, which describes a backward search methodology for proper controller initialization. However, this approach places relatively large real-time computational demands upon the system, limiting its usefulness in real world disc drive applications where processing resources are usually limited.

Three additional methodologies were proposed by Yamaguchi et al. in "Design of Mode Switching Controller with Initial Value Compensation and its Application to Disk Drive Servo Control," IFAC 13$^{th}$ *Triennial World Congress*, San Francisco, Calif., USA, 1996, pp. 471–476, and "Design of Mode Switching Controller with Initial Value Compensation and its Application to Head Positioning Control on Magnetic Disk Drives," IEEE *Transactions on Industrial Electronics*, Vol. 43, No. 1, 1996, pp. 65–73. The first two methodologies proposed by Yamaguchi et al. in the foregoing papers involves resetting controller (observer) states at settling mode initialization. Although operative, such approaches, at least to some extent, impede other critical tasks of the disc drive servo system, such as setting on-track check criterion, adaptively calibrating gain, etc. The third methodology proposed by Yamaguchi et al. involves canceling all closed-loop poles of the track following controller and replacing these poles at desired positions. However, like the methodology proposed by Eddy et al., this approach can be undesirably complex, in that an additional high order compensator is necessary for the initial value of the states. Also, there is generally no easy way to adapt the system to account for changes in temperature and similar factors which tend to adversely affect servo performance.

Accordingly, there is a continual need in the art for improvements whereby settling characteristics of a disc drive can be adaptively optimized in the presence of parametric variations which tend to introduce significant levels of head velocity errors.

SUMMARY OF THE INVENTION

The present invention provides an apparatus and method for minimizing settling time in a disc drive.

In accordance with a preferred embodiment, the disc drive is provided with a head which is controllably positionable adjacent a rotatable disc on which a plurality of tracks are defined. A motor, such as a voice coil motor (VCM), is operably coupled to the head for positional control of the head in response to current applied to the motor.

A servo circuit is provided to settle the head onto a destination track at the conclusion of a seek operation by determining velocity of the head at a selected distance from the destination track (also referred to as a settling transition point), comparing the velocity to a desired velocity of the head at the selected distance from the destination track, applying a settling current correction value to a current command signal to generate a modified current command signal, and using the modified current command signal to settle the head onto the destination track. The settling current correction value is determined in relation to the estimated velocity and position of the head as the head reaches the transition point between seeking and settling (which is a selected distance from the destination track, such as one track away). The settling current correction value serves to add an additional zero to the response of the servo circuit, with the placement of the zero adaptively determined in relation to a weighting of the locations of the slowest two poles (i.e., the two poles that are closest to one in the z-domain).

Preferably, the servo circuit comprises an observer which generates estimates of head position and velocity and a settling table which adaptively outputs the settling current correction value in response to the estimated head position and velocity of the head at the transition point selected distance from the destination track. Moreover, the servo circuit preferably comprises a programmable processing device having associated programming to settle the head onto the destination track.

These and various other features as well as advantages which characterize the present invention will be apparent from a reading of the following detailed description and a review of the associated drawings.

BRIEF DESCRIPTION OF THE DRAWINGS

FIG. 7 is a control diagram representation showing the operation of the servo system of FIG. 3 in accordance with a preferred embodiment of the present invention, with the control diagram of FIG. 7 being generally representative of the programmed operation of the digital signal processor (DSP) of FIG. 3.

FIG. 8 is a representation of a portion of a selected track of the disc drive, showing the relative arrangement of servo blocks and user data blocks in accordance with an embedded servo scheme utilized by the disc drive.

DETAILED DESCRIPTION

Figure 1:
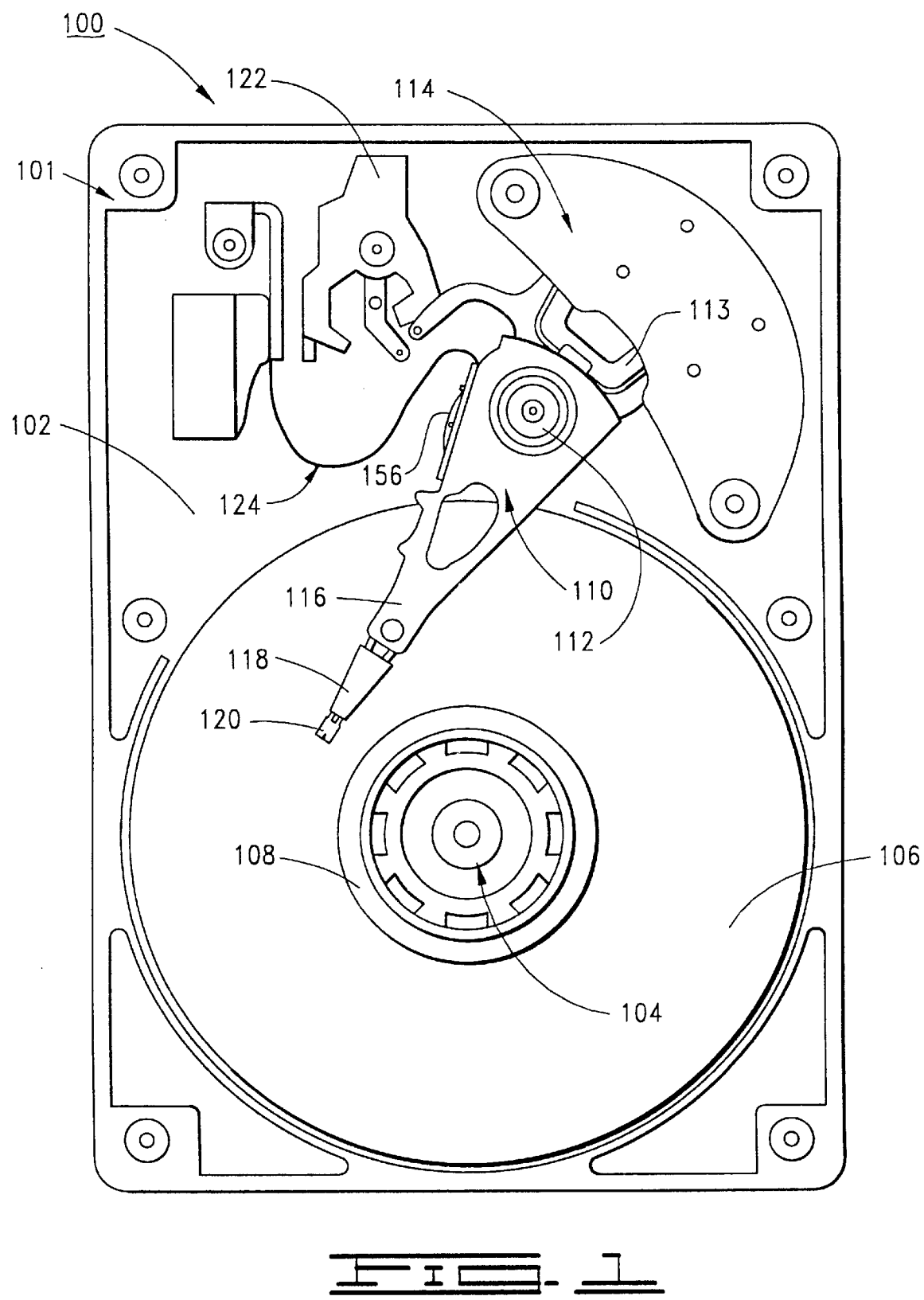
FIG. 1 is a top plan view of a disc drive constructed in accordance with a preferred embodiment of the present invention.

Turning now to the drawings, and more particularly to FIG. 1, shown therein is a top plan view of a disc drive 100 constructed in accordance with a preferred embodiment of the present invention.

The disc drive 100 includes a head-disc assembly (HDA) 101 and a disc drive printed wiring assembly (PWA) which is mounted to the underside of the HDA 101 and thus, not visible in FIG. 1. The PWA provides circuitry necessary to control the operation of the HDA 101 and to transfer data between the HDA 101 and a host computer in which the disc drive 100 can be mounted in a user environment.

The HDA 101 includes a base deck 102 to which various disc drive components are mounted. A top cover, which has been omitted from FIG. 1 to expose interior components of interest, cooperates with the base deck 102 to form an internal environment for the disc drive 100 with controlled air pressure, humidity and cleanliness levels.

A spindle motor 104 is provided to rotate a stack of discs 106 at a constant high speed, with a disc clamp 108 securing the discs 106 to the spindle motor 104. It will be understood that a plurality of nominally concentric tracks (not separately illustrated) are defined on each of the surfaces of the discs 106 in a conventional manner.

To access the tracks, a controllably positionable actuator assembly 110 is provided which rotates about a cartridge bearing assembly 112 in response to currents applied to a coil (a portion of which is shown at 113) of a voice coil motor (VCM) 114. The actuator assembly 110 includes a plurality of arms 116 from which corresponding flexure assemblies 118 extend. Heads 120 are provided at distal ends of the flexure assemblies 118 and are supported over the discs 106 by air bearings established by air currents set up by the rotation of the discs 106. The heads 120 are preferably characterized as magneto-resistive (MR) heads.

A latch assembly 122 is provided to secure the heads over landing zones (not designated) at the innermost diameters of the discs 106 when the disc drive 100 is deactivated. A flex circuit assembly 124 provides electrical communication paths between the actuator assembly 110 and the disc drive PWA (mounted to the underside of the disc drive 100 as mentioned above).

Figure 2:
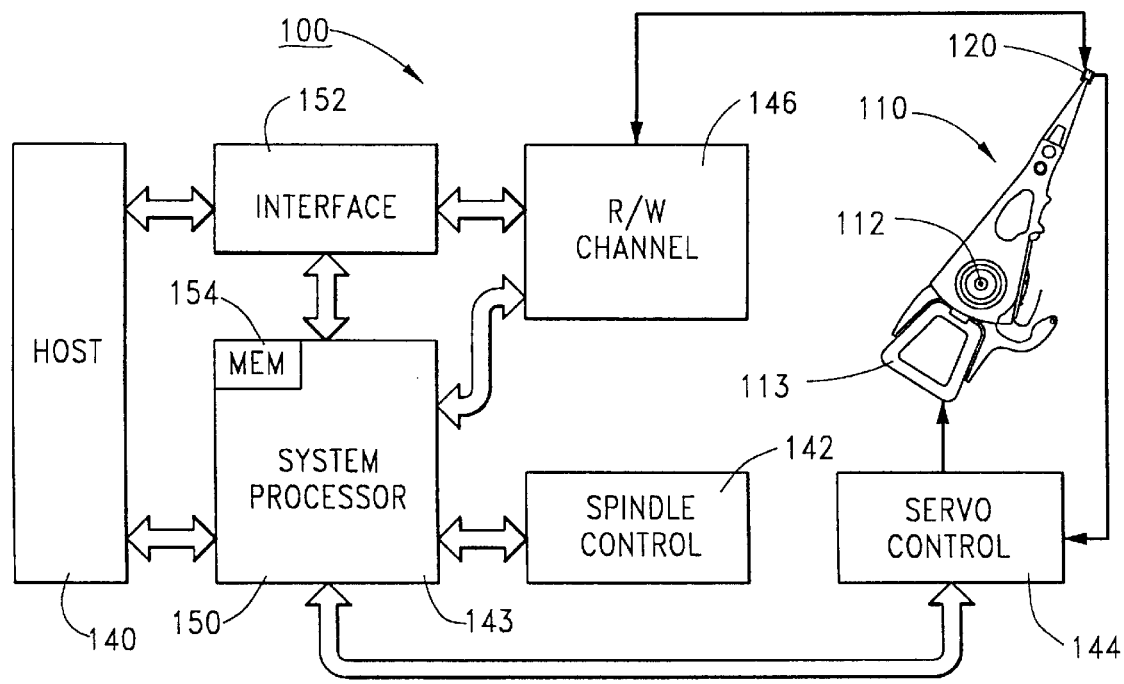
FIG. 2 is a functional block diagram of the disc drive of FIG. 1.

FIG. 2 provides a functional block diagram of the disc drive 100 of FIG. 1, operably connected to a host computer 140. As shown in FIG. 2, the circuitry used to control the HDA 101 includes a spindle control circuit 142, a servo control circuit 144 and a read/write channel 146, all operably connected to a system processor 150. It will be recognized that the system processor 150 communicates with and controls the operation of these circuits in a known manner, with the exceptions as discussed below. Additionally, an interface circuit 152 is shown connected to the read/write channel 146 and to the system processor 150, with the interface circuit 152 serving as a data interface and buffer for the disc drive. The interface circuit 152 includes a sequencer (not separately shown) which comprises hardware used to establish varying timing sequences during the operation of the read/write channel 146.

The spindle control circuit 142 controls the rotational speed of the spindle motor 104 (FIG. 1). The servo control circuit 144 (also referred to herein as "servo circuit") controls the position of the heads 120 with respect to the discs 106 by applying current to the actuator coil 113 in response to servo information read by the heads 120. The read/write channel 146 operates to write data to the discs 106 in response to user data provided to the channel from the interface circuit 152 by encoding and serializing the data and generating a write current utilized by the head 120 to magnetize portions of a selected track on the disc 106.

Correspondingly, previously stored data are retrieved by the read/write channel 146 by decoding the data from the read signals generated by the head 120 as the head passes over the selected track on the disc 106. Various operations of the disc drive 100 are controlled by the system processor 150, in accordance with programming stored in memory (MEM) 154, which preferably comprises both volatile memory devices such as dynamic random access memory (DRAM) as well as non-volatile memory devices such as flash memory.

Figure 3:
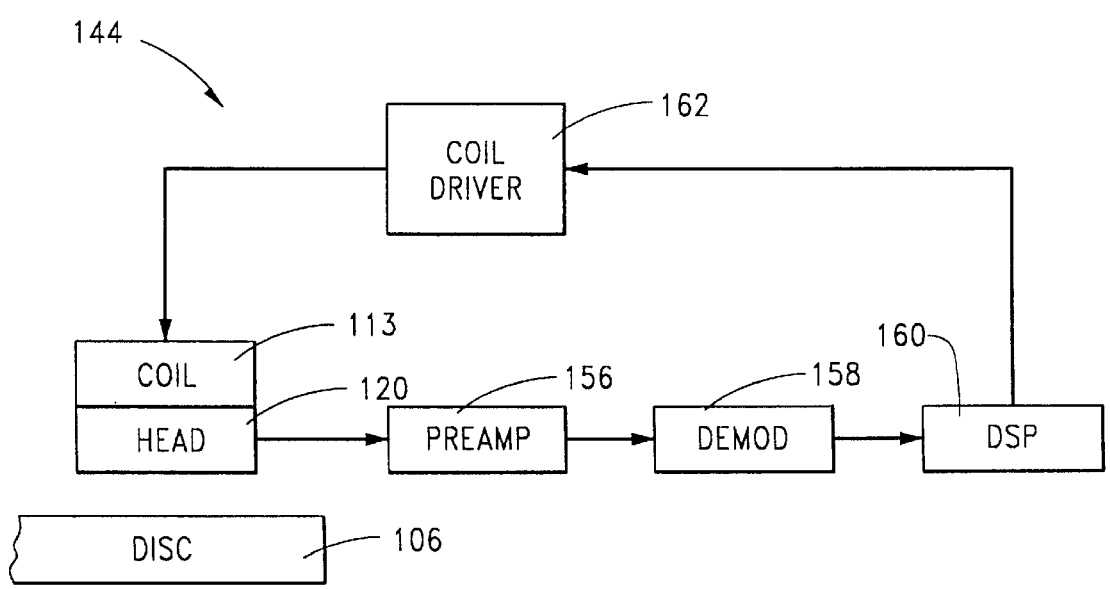
FIG. 3 is a functional block diagram of the servo circuit of FIG. 2.

Referring now to FIG. 3, shown therein is a functional block diagram of the servo circuit 144 of FIG. 2. As set forth by FIG. 3, servo information is read by the selected head 120 and amplified by a preamplifier circuit 156 ("preamp"). The preamp 156 is preferably disposed in the HDA 101 and mounted to a circuit board of the actuator assembly 110, as shown in FIG. 1. The amplified readback signals are presented to a demodulator circuit 158 ("demodulator," or "demod") which conditions the signals (including analog-to-digital conversion) and provides the same to a digital signal processor (DSP) 160.

The operation of the DSP 160 in accordance with a preferred embodiment of the present invention will be discussed in greater detail below; generally, however, the DSP 160 generates a position error signal (PES) indicative of the position of the head 120 with respect to the disc 106 from the signals from the demodulator 158. In response to the resulting PES, as well as control inputs provided to the DSP 160 by the system processor 150 (FIG. 2), the DSP 160 outputs a correction signal to a coil driver 162 which in turn applies current to the coil 113 to adjust the position of the head 120.

Figure 4:
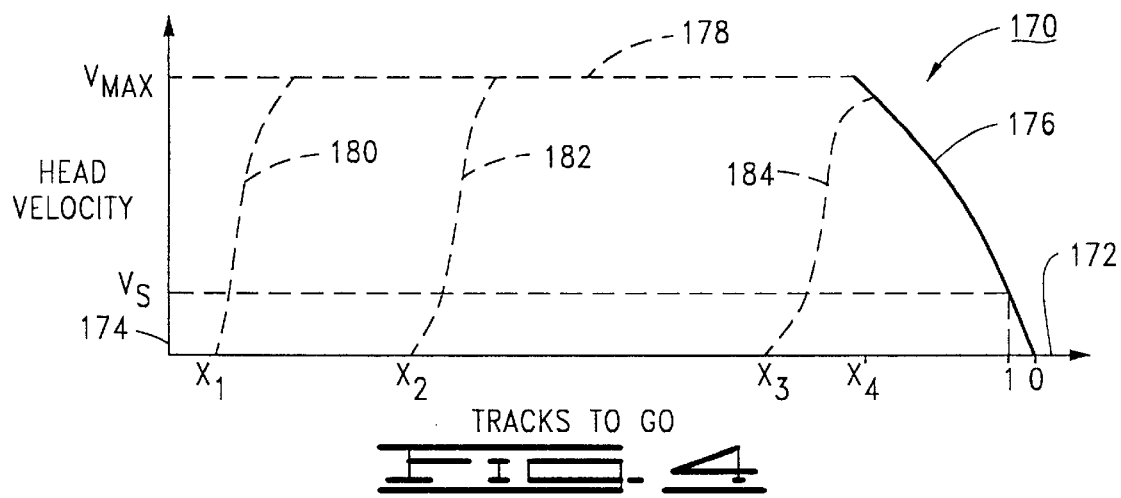
FIG. 4 provides a graphical illustration of a velocity profile of a selected head of the disc drive during a seek operation wherein the head is moved from an initial track and settled onto a destination track.

Referring now to FIG. 4, shown therein is a graphical representation of a family of velocity profiles (denoted generally at 170), with each velocity profile defining the desired trajectory of a selected head 120 of the disc drive 100 during a seek operation wherein the head 120 is moved from an initial track and settled onto a destination track. The family of velocity profiles 170 is plotted against an x-axis 172 indicative of tracks (measured in tracks to go, with track "0" being the destination track) and a y-axis 174 indicative of the velocity of the head 120.

As shown in FIG. 4, a deceleration trajectory portion 176 is substantially common to each of the family of velocity profiles 170, with the deceleration trajectory portion 176 indicative of the desired velocity of the head 120 as the head approaches the destination track. The deceleration trajectory portion 176 extends to a maximum velocity $V_{MAX}$ (indicated by dotted line 178) which is a maximum velocity that the head 120 obtains as the head moves to the destination track. As shown in FIG. 4, the deceleration trajectory portion 176 meets the $V_{MAX}$ line 178 at a track denoted as $X_4$, which is a selected number of tracks away from the destination track 0.

FIG. 4 further shows a number of different acceleration trajectory portions 180, 182 and 184 (beginning at tracks $X_1$, $X_2$ and $X_3$, respectively). When the disc drive 100 performs a seek operation from track $X_1$, to track 0, the head 120 is accelerated along portion 180, coasts along line 178 at $V_{MAX}$ and is then decelerated along portion 176 to the destination track 0. A seek from track $X_2$ is similarly performed, except that the head 120 spends less time at $V_{MAX}$ (i.e., along line 178) because track $X_2$ is closer to track 0 than track $X_1$. In some cases, a seek length can be short enough that the head 120 does not reach the maximum velocity $V_{MAX}$, such as generally shown by acceleration portion 184. That is, to seek from track $X_3$ to track 0, the head 120 is accelerated along portion 184 until it reaches the deceleration portion 176, after which the head 120 is decelerated to the destination track 0.

It will be understood that relatively short seeks can be performed using a position and velocity controlled methodology, so that the velocity controlled seeks contemplated herein are relatively long seeks (such as 60 tracks or more). In this regard, the x-axis 172 of FIG. 4 should not be considered as being necessarily drawn to scale (i.e., the relative distance between tracks 0 and 1 is not necessarily indicative of the relative spacing of remaining tracks on the axis). However, it will be understood that the velocity controlled approach discussed herein is provided by way of illustration and is not limiting.

Figure 5:
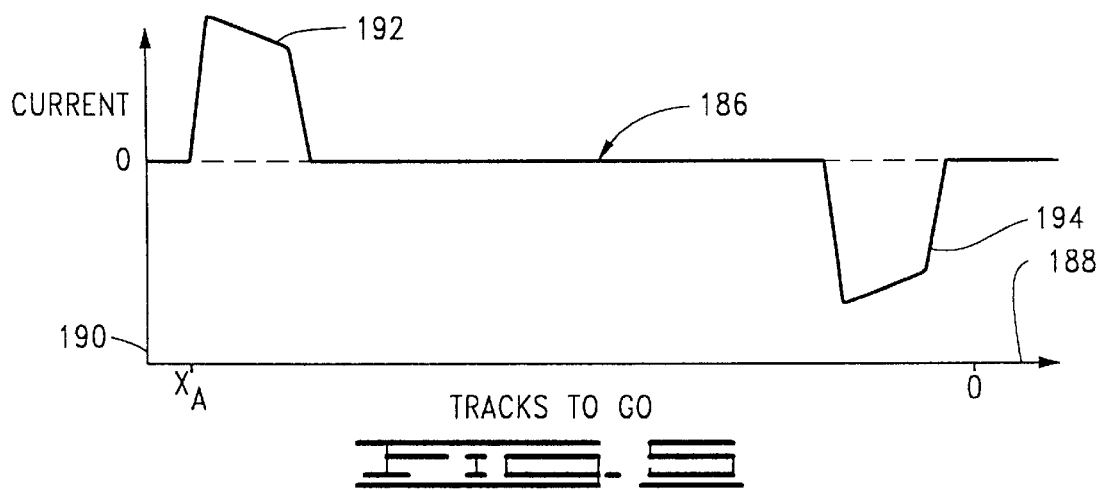
FIG. 5 provides a graphical illustration of a current profile, showing the current that is applied to the coil of the voice coil motor (VCM) of the disc drive during the seek operation illustrated with respect to FIG. 4.

FIG. 5 provides a generalized representation of a current profile 186 applied to the coil 113 during a seek from track $X_1$ to track 0. The current profile 186 is plotted against an x-axis 188 indicative of tracks (in terms of tracks to go) and a y-axis 190 indicative of current magnitude. From FIGS. 4 and 5, it can be seen that a large amount of current is initially applied (as shown at 192 of the profile 186) to accelerate the head 120 toward the target track 0. Once the head 120 reaches $V_{MAX}$ (portion 178), relatively little current is required to maintain the head at this velocity, as shown by curve 186. When track $X_4$ is detected (i.e., the head reaches beginning of the deceleration portion 176 of FIG. 4), a corresponding large amount of current of opposite polarity (as shown at 194 of the profile 190) is applied to the coil 113 to decelerate the head 120 to the track 0.

When the track reaches a selected distance from the destination track 0 (such as one track away, as indicated in FIG. 4), the servo circuit 144 transitions from a seek mode to a settle mode, and attempts to settle the head 120 onto the destination track 0 in as short a time as possible. At one track away from the destination track 0, the head 120 should desirably have a velocity $V_s$, as indicated in FIG. 4.

Figure 6:
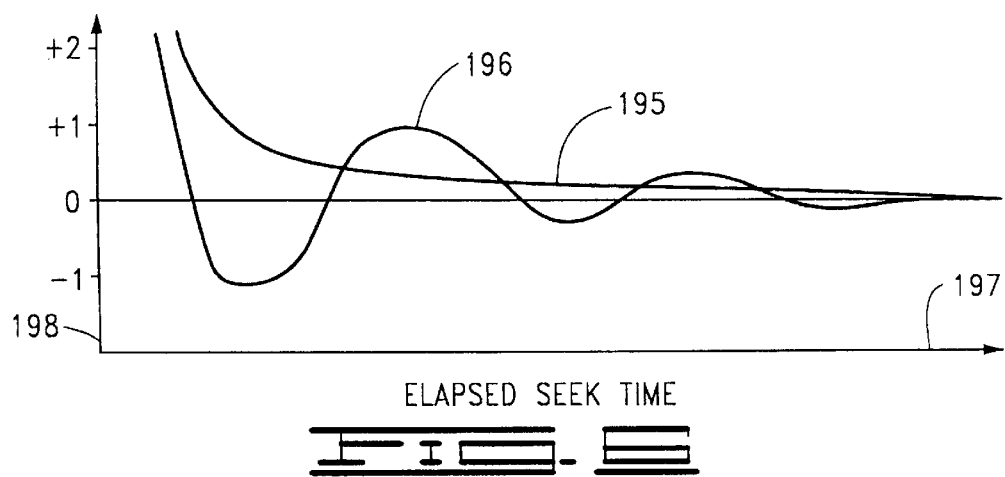
FIG. 6 provides a graphical illustration of the trajectory of the head at the settling phase of a seek, illustrating problems with both undershoot (wherein the head takes too long to approach the destination track) as well as overshoot (wherein the head overshoots the destination track and provides an oscillatory response).

Due to various effects inherent in modern disc drive designs, however, velocity errors can arise at this transition point, resulting in either undershoot (as represented by undershoot settle trajectory curve 195 in FIG. 6) or overshoot (as represented by overshoot settle trajectory curve 196 of FIG. 6). Both the curves 195, 196 are plotted in FIG. 6 against an x-axis 197 generally indicative of elapsed seek time and a y-axis 198 indicative of position (with "0" on the y-axis 198 of FIG. 6 corresponding to the center of the destination track 0 of FIGS. 4 and 5). The undershoot trajectory curve 195 of FIG. 6 arises when the actual velocity of the head 120 at track 1 is too low, resulting in the head 120 having insufficient velocity to reach a predetermined threshold (capture limit) about the center of track 0 (such as ±10% of the track width) defining a range within which read and write operations can be safely performed. Likewise, the overshoot trajectory curve 196 arises when the actual velocity of the head 120 at track 1 is too high, resulting in the head 120 coming in too fast and undesirably oscillating about the center of the track 0.

To minimize such overshoot and undershoot conditions, FIG. 7 has been provided which shows a control block diagram of the servo circuit 144 of FIGS. 2 and 3, constructed in accordance with a preferred embodiment of the present invention. It will be understood that FIG. 7 is generally representative of the programming of the DSP 160 of FIG. 3 and sets forth functional aspects of the DSP 160 in accordance with a preferred embodiment.

With reference to FIG. 7, a plant block 200 is shown, indicative of relevant mechanical aspects of the disc drive 100, including the head 120, the coil 113, the discs 106, the voice coil motor 114 and the demodulator 158. The plant 200 receives a current command signal $I_{CMD}$ on signal path 202 to position a selected head (not shown) adjacent a selected track (also not shown) of the plant 200. In response to servo information on the track, the plant 200 generates a PES which is output on signal path 204.

The control diagram of FIG. 7 also shows an observer 206 based on a plant model having nominally the same input/output response characteristics as the plant 200. As will be recognized by those skilled in the art, the observer 206 generates a position estimate $X_{EST}$, a velocity estimate $V_{EST}$ and a bias estimate $W_{EST}$ on signal paths 208, 210 and 212, respectively, which correspond to estimates of head position, head velocity and bias force. The bias force estimate $W_{EST}$ takes into account spring forces exerted upon the actuator as a result of the flexure assembly (such as 124 of FIG. 1), windage forces upon the heads, and the like.

Additionally, a reference generator 214 is provided which provides position reference $X_{REF}$, velocity reference $V_{REF}$ and current reference $I_{REF}$ signals indicative of the desired position, velocity and current settings for the plant 200. These signals are output on paths 216, 218 and 220, respectively and have values which generally depend upon the particular operational mode of the servo circuit, such as track following or seeking. As will be recognized, the velocity reference $V_{REF}$ generally corresponds to the appropriate velocity profile (such as discussed above with reference to FIG. 4) during a seek operation.

A summing junction 222 determines a position error $X_{ERR}$ as the difference between the position reference $X_{REF}$ and the position estimate $X_{EST}$, as shown. Similarly, a summing junction 224 determines a velocity error $V_{ERR}$ as the difference between the velocity reference $V_{REF}$ and the velocity estimate $V_{EST}$. The position error $X_{ERR}$ is provided to a gain block 226 having a scalar gain of $K_x$ and the velocity error $V_{ERR}$ is provided to a gain block 228 having a scalar gain of $K_v$, so that the output quantities are summed by a summing junction 230.

The output of the summing junction 230 is further summed with the bias estimate $W_{EST}$ and the current reference $I_{REF}$ at a summing junction 232. The output sum of the summing junction 232 is provided along functional path 233 to summing junction 234, which additionally receives an input from a settle table block 236, as described more fully below. At this point, however, it will be noted that the output of the summing junction 234 is provided on signal path 238 as a control input to the observer 206 and is a current correction input indicative of the amount of current to be applied to the plant 200. To account for nominal variations in the operation of the plant 200, the output of the summing junction 234 is also provided to a gain block 240 having a gain $K_p$, so that the output thereof comprises the current command $I_{CMD}$ signal on path 202. As will be recognized, the gain $K_p$ can be adjusted in a conventional manner to ensure the observer 206 maintains an accurate model of the plant 200.

Finally, the PES on signal path 204 is summed with the position estimate $X_{EST}$ on path 208 by a summing junction 242 to generate an observer error $O_{ERR}$ signal as an input to the observer 206 on path 240.

Accordingly, normal operation of the control system of FIG. 7 (absent the selective operation of the settling table 236) is initially governed as follows:

$$X_{ERR} = X_{REF} - X_{EST} \quad (1)$$

$$V_{ERR} = V_{REF} - V_{EST} \quad (2)$$

$$O_{ERR} = PES - X_{EST} \quad (3)$$

$$I_{CMD} = (X_{ERR} K_x = V_{ERR} K_v + I_{REF} + W_{EST})(K_p) \quad (4)$$

To facilitate a discussion of the manner in which the settle table block 236 ("table") of FIG. 7 operates to adaptively improve the settling performance of the plant 200, it will first be helpful to briefly refer to FIG. 8, which shows a portion of a selected track 250 from the discs 106. The disc drive 100 employs an embedded servo scheme, so that servo blocks 252 are periodically disposed on the same disc surfaces as data blocks 254 used to store user data. The servo blocks 252 contain servo information used by the servo circuit 144 and are written during disc drive manufacturing so as to be arranged as a plurality of radially extending wedges, like spokes of a wheel. The data blocks 254 are thereafter created between adjacent servo blocks 252 during a disc drive formatting operation and accessed during subsequent disc drive read and write operations to transfer data between the data blocks 254 and the host computer 140 (FIG. 2).

The PES (path 204 of FIG. 7) is generated as each servo block 252 in turn is read by the head 120. The observer 206 is characterized as multi-rate, in that a selected number of position, velocity and bias estimates (such as four) are provided between successive PES values. The rate at which the observer 206 generates these estimates is referred to herein as the sampling rate of the servo circuit 144, with the identifier k used to generally denote a particular sample. Accordingly, the estimated position, velocity and bias for the next sample (k+1) after the sample k is set forth by the following general relationship:

$$\begin{bmatrix} X_{EST}(k+1) \\ V_{EST}(k+1) \\ W_{EST}(k+1) \end{bmatrix} = A \begin{bmatrix} X_{EST}(k) \\ V_{EST}(k) \\ W_{EST}(k) \end{bmatrix} + Bu(k) + L(PES - X_{EST}(k)) \quad (5)$$

where $X_{EST}(k+1)$, $V_{EST}(k+1)$ and $W_{EST}(k+1)$ are the estimated position, velocity and bias for sample (k+1), $X_{EST}(k)$, $V_{EST}(k)$ and $W_{EST}(k)$ are the estimated position, velocity and bias for sample k, A and B are matrices describing the plant 200, u(k) is the current correction signal at path 233 (output by the summing block 232), and L is the gain of the observer 206.

As provided above, a seek operation generally comprises a seek mode followed by a settling mode. During the seek mode, the appropriate velocity profile is utilized to govern the trajectory of the head 120 as it is moved toward the destination track. The head 120 is initially accelerated and then decelerated (such as set forth by FIG. 4 above) in response to current applied to the VCM 114 (such as shown by FIG. 5 above), which in turn is controlled by a current command signal (such as output by summing block 232 on path 233 in FIG. 7). Also, no output is provided by the settling table 236 during the seek mode, so that the servo circuit 144 generally operates in accordance with equations (1) through (4) above.

At such time that the head reaches the settling transition point (such as one track away from the destination track), the settling mode is commenced so that a settling current correction value is output by the settling table 236 to generate a modified current command signal, as follows:

$$u_A(k) = u(k) + \Delta u(0) \quad (6)$$

where $u_A(k)$ is the modified current command signal output by the summing block 234 on path 238 (FIG. 7) and used to control the application of current to the VCM 114, u(k) is the current command signal provided to the summing block 234 on path 233, and $\Delta u(0)$ is the settling current correction value provided by the settling table 236 to the summing junction 234 on path 237. It will be understood that the sample reference "0" in $\Delta u(0)$ denotes the first sample of the settling mode (i.e, k can be considered as being reset to "0" at the first sample of the settling mode, as the settling transition point is reached).

Although the manner in which the settling table 236 generates the $\Delta u(0)$ correction value will be discussed in greater detail below, generally it will be noted at this time that the correction value is determined in relation to the estimated position $X_{EST}$ and the estimated velocity $V_{EST}$ at the settling transition point. Further, the operation of the settling table 236 is adaptively controlled in relation to feedback provided by the PES on path 204, as shown in FIG. 7.

It will be recognized that the modification of the current command signal (i.e., generation of $U_A(k)$ during settling) results in a modification of the response of the servo system. In other words, the operation of the table 236 can be characterized as the placement of an additional zero in the system response to improve settle performance. To more fully illustrate this point, the following describes a discrete-time state space model of the plant 200:

$$x_d(k+1) = A_d x_d(k) + B_d u(k) \quad (7)$$

$$y(k) = C_d x_d(k) \quad (8)$$

with sample rate k, state $X_d$ (i.e., position X and velocity V), output y, input u and matrices $A_d$, $B_d$ and $C_d$ describing the plant. Such discrete-time state space modeling is commonly employed by disc drive designers; see for example U.S. Pat. No. 5,668,680 issued Sep. 16, 1997 to Tremaine, assigned to the assignee of the present invention. Correspondingly, an observer model can be stated as:

$$x_e(k+1) = A_d x_e(k) + B_d u(k) + L_{e1}[y(k+1) - C_d x_e(k+1)] \quad (9)$$

where x(k) is a matrix of $\{X_{EST}, V_{EST}\}$. A controller model can be stated as:

$$u_c(k) = -K_c x_e(k) \quad (10)$$

A single sided z-transform is given as:

$$X(z) = \sum_{k=0}^{\infty} x(k) z^{-k} \quad (8)$$

Thus, $$Z[x(k+1)] = z[X(z) - x(0)] \quad (12)$$

and $$U(z) = -K_C x_e(z) + \Delta u(0) \quad (13)$$

where $$\Delta u(0) = u(0) + K_c x_e(0) \quad (14)$$

with $\Delta u(0)$ being the settling current correction value of equation (6) above.

Taking the z-transforms of equations (7) to (10), substituting into equation (13) and solving for Y(z) yields the following:

$$Y(z) = C_d[zI - A_d + B_d K_c(zI-A_c)^{-1} L_c C_d A_d]^{-1} \cdot [zX_d(0) - B_d K_c (zI-A_c)^{-1} z X_e(0)] + [I - B_d K_c(zI-A_c)^{-1}] B_d \Delta u(0) \quad (15)$$

where $$A_c = A_d - LC_d A_d - B_d K_c \quad (16)$$

At the settling transition point, let $xd(0) = xe(0)$. Substituting $z = z_1$ into equation (15), with $z_1$ a zero of the system response, $$Y(z_1) = 0 \quad (17)$$

Further, from equation (15), identifying a 1×2 matrix M (with terms $M_1$, $M_2$) and a scalar n as:

$$M = zX_d(0) - B_d K_c(zI-A_c)^{-1} z \quad n = I - B_d K_c(zI-A_c)^{-1} B_d \quad (18)$$

and combining with equation (17), we have:

$$M X_e(0) - n\Delta u(0) = 0 \quad (19)$$

so that $$\Delta u(0) = \frac{M X_e(0)}{n} = K_{SX} X_{EST}(0) + K_{SV} V_{EST}(0) \quad (20)$$

with settling gains $K_{sx}$ and $K_{sv}$ determined by $K_{sx} = M_1/n$ and $K_{sv} = M_2/n$. Thus, the settling current correction value $\Delta u(0)$ is determined by the settling table 236 in accordance with equation (20). That is, at each settling transition point, the estimated position and velocity $X_{EST}$ and $V_{EST}$ are provided to the settling table 236, which outputs the appropriate settling current correction value $\Delta u(0)$ in response thereto.

Of course, the various terms in the foregoing analysis will depend upon the configuration of a given disc drive design. Thus, well known numerical software, such as Matlab® by The MathWorks, Inc. of Natick, Massachusetts, USA can be used to derive the settling gains.

It will be recognized that $\Delta u(0)$ serves to place a zero ($z_1$) in the numerator of $Y(z)$. One design method could be to choose the zero $z_1$ so as to cancel the slowest closed-loop poles of the track following mode controller, similarly to as suggested by Yamaguchi et al. above. A significant problem, however, is that such an approach yields a design that is overly complex, as well as sensitive to disc drive parametric variation and unmodeled resonances.

Accordingly, in a preferred embodiment, assuming that the slowest and the second slowest closed-loop poles are $P_1$ and $P_2$, the additional zero $z_1$ is selected such that:

$$z_1 = \alpha p_1 + (1-\alpha) p_2 \qquad (21)$$

where $\alpha$ is a weight value ranging from zero to one (i.e., $0 \leq \alpha \leq 1$). More particularly, a set of different position and velocity settling gains $K_{SX}$ and $K_{SV}$ are selected for different values of $\Delta$ (such as from 0 to 1 using a resolution of 0.1). Thereafter, an initial set of settling gains $K_{SX}$ and $K_{SV}$ is selected, corresponding to a particular value of $\Delta$ (such as $\Delta = 0.5$). If, from the PES (path 204 in FIG. 7) the settling performance is less than optimum (i.e, some amount of overshoot or undershoot is detected), then the table can be incremented for the next seek (using, for example, the settling gains for $\alpha = 0.6$).

Figure 9:
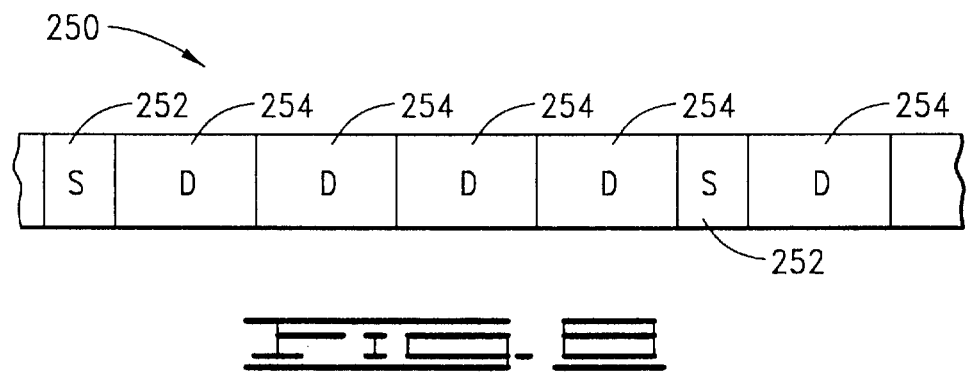
FIG. 9 is a flow chart illustrating an ADAPTIVE SETTLE routine, indicative of the programming of the DSP of FIG. 3 and setting forth more clearly the operation of the control diagram of FIG. 7 during a seek operation.

To further explain the operation of the table 236, FIG. 9 shows a SEEK WITH ADAPTIVE SETTLE routine 260, setting forth the steps performed by the servo circuit 144 in accordance with a preferred embodiment.

At step 262, the disc drive 100 initiates the seek mode of the seek operation whereby a selected one of the heads 120 is moved from an initial track toward a destination track. For clarity, it will be assumed that the initial track corresponds to track $X_1$ (FIG. 4) and the destination track is track 0 (FIG. 4). During step 262, the head is initially accelerated and then decelerated in accordance with the current curve 186 of FIG. 5 so that the head 120 nominally follows the trajectory defined by velocity profile portions 180, 178 and 176 of FIG. 4.

As the head 120 is moved from track $X_1$ to track 0, as shown by decision step 264, the servo circuit 144 continually determines the position of the head (using the estimated position $X_{EST}$) until such time that the head 120 reaches the settling mode transition point one track away from track 0.

When the settling mode transition point is reached, the servo circuit 144 determines the estimated position $X_{EST}$ and estimated velocity $V_{EST}$, step 266, and outputs the appropriate settling current correction value $\Delta u(0)$ to settle the head 120 onto the destination track, step 270. During settling, as shown by step 272, the PES (path 204 of FIG. 7) is provided to the settling table 236 to improve settling performance by adjusting the set of settling gains $K_{SX}$ and $K_{SV}$. Finally, the routine of FIG. 9 ends at 274, after which the servo circuit 144 operates in track following mode until commanded to perform the next seek (using the new values of $K_{SX}$ and $K_{SV}$).

Figure 10:
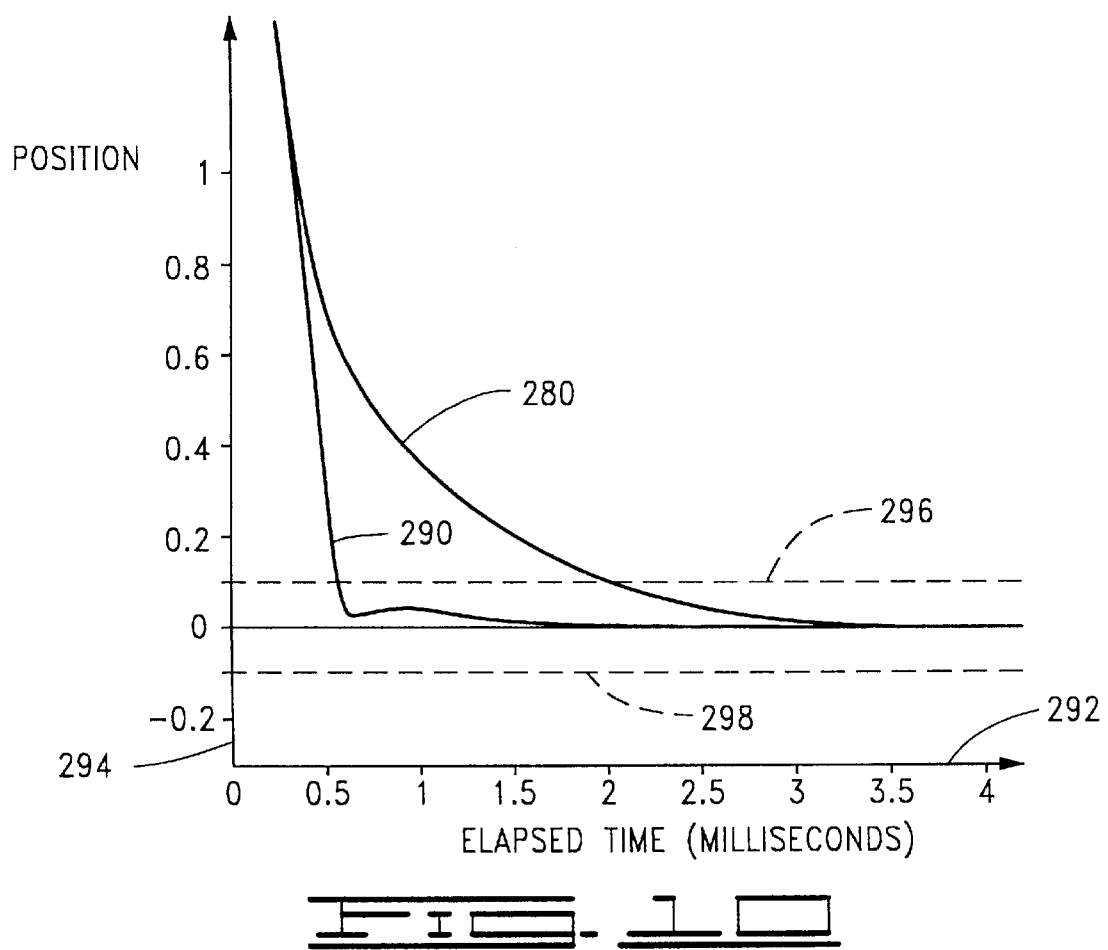
FIG. 10 provides graphical representations of the results of computer simulations, showing the improvements in settling performance obtained through use of the control diagram and routine of FIGS. 7 and 9.
Figure 9:
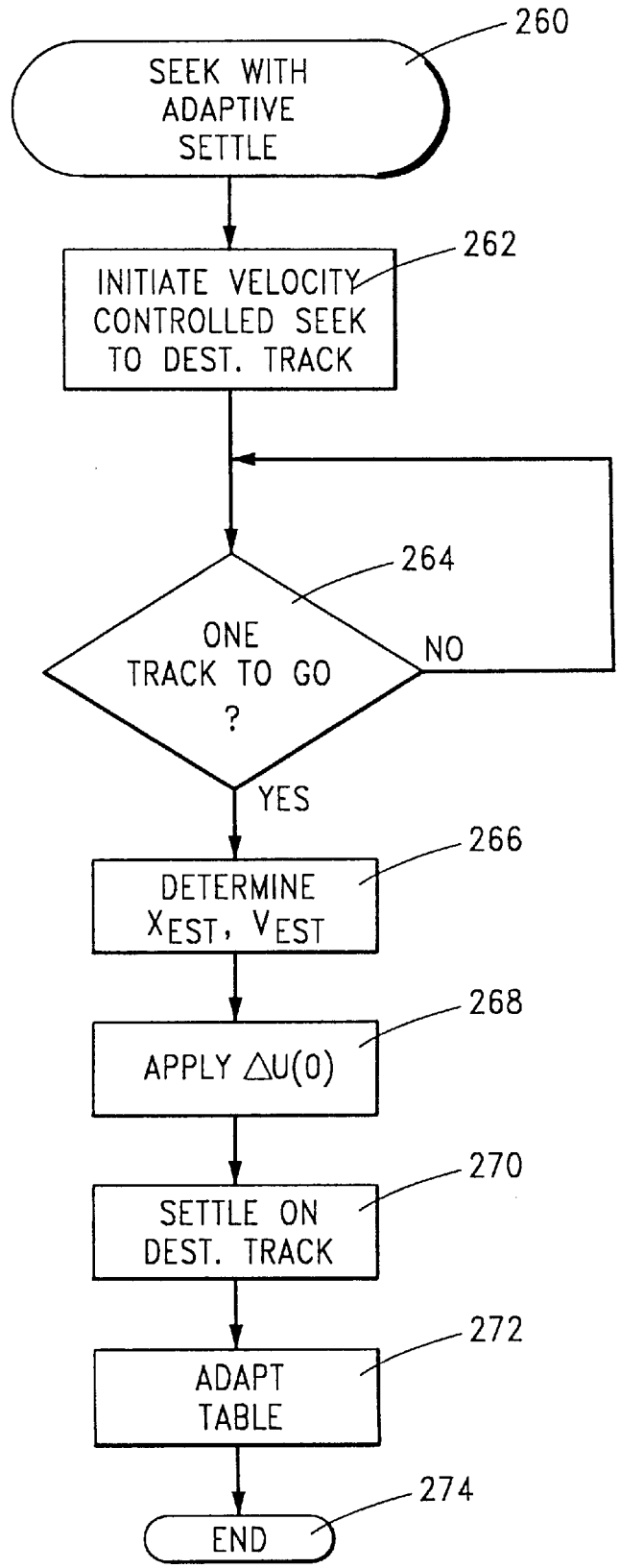

Having concluded the foregoing discussion of the servo circuit 144, reference is now made to FIG. 10, which shows the results of computer simulations of the operation of the control diagram of FIG. 7. More particularly, FIG. 10 sets forth an uncompensated settle curve 280 and a compensated settle curve 290, both of which are plotted against an x-axis 292 indicative of elapsed settling time (in milliseconds) and a y-axis 294 indicative of position.

The "0" mark on the y-axis 294 corresponds to the center of the destination track. Dotted lines 296 and 298 indicate positions ±10% (with respect to track width) away from the center of the track, with operational fault conditions declared during read or write operations when the head 120 exceeds these boundaries.

As shown by FIG. 10, the use of the control diagram of FIG. 7 results in a substantial reduction in settling time for the compensated settle curve 290 as compared to the uncompensated settle curve 280. While curve 280 achieves a settle time of around two milliseconds (2 msec), curve 290 achieves a settle time of less than one millisecond (1 msec). Thus, the present invention not only achieves substantially improved settling performance over what is typically achieved under nominal conditions, but further advantageously operates to adaptively accommodate large parametric variations that would otherwise induce the types of undershoot and overshoot shown in FIG. 5 that can undesirably extend the settling time by one or more milliseconds.

As can be seen from the foregoing discussion, various advantages are associated with the present invention i(as embodied above). First, the system is relatively simple to implement in a DSP such as 160, as compared to the previously mentioned Eddy et al. and Yamaguchi et al. approaches. Second, the weight value $\alpha$ can be used as an adaptive parameter to compensate for variations in disc drive performance characteristics (such as with temperature variations, etc.). For example, when the control diagram of FIG. 7 is configured so as to accurately model the response of the plant (so that resonances are minimized), the weight value $\alpha$ can be selected so as to be close to one; otherwise, the weight value can be selected so as to be closer to zero. Moreover, the present system readily accommodates the injection of values over multiple samples during the settling operation (i.e., not only can $\Delta u(0)$ be used, but also $\Delta u(1)$, etc.).

In summary, the present invention is directed to an apparatus and method for minimizing settling time in a disc drive (such as 100). The disc drive includes a head (such as 120) adjacent a rotatable disc (such as 106) on which a plurality of tracks (such as 250) are defined and a motor (such as 114) which controllably positions the head in response to current applied to the motor.

A servo circuit (such as 144) is provided to settle the head onto a destination track at the conclusion of a seek operation by determining velocity of the head at a selected distance from the destination track (such as by 264, 266), comparing the velocity to a desired velocity of the head at the selected distance from the destination track, applying a settling current correction value to a current command signal to generate a modified current command signal in relation to an estimated position and an estimated velocity (such as by 268), and using the modified current command signal to settle the head onto the destination track (such as by 270). The application of the settling gain serves to add an additional zero to the response of the servo circuit, with the placement of the zero preferably determined in relation to a weighting of the locations of the closest two poles of the response.

Preferably, the servo circuit comprises an observer (such as 206) which generates estimates of head position and velocity and a settling table (such as 236) which outputs the settling gain in response to the estimated velocity of the head at the selected distance from the destination track. Moreover, the servo circuit preferably comprises a programmable processing device (such as 160) having associated programming to settle the head onto the destination track.

For purposes of the appended claims, consistently with the foregoing discussion the term "signal" will be understood to include both analog and digital expressions. The term "circuit" will be understood to include both hardware and software/firmware type implementations.

The phrase "programmable processing device" will be understood to describe any number of types of programmable processors which carry out instructions in associated programming, such as the DSP 160. Although certain method claims below are provided with steps in a particular order, it will be readily understood that the claimed invention is not necessarily limited to the order of the steps presented, unless otherwise particularly indicated by the language of the claims.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. In a disc drive having a head adjacent a rotatable disc on which a plurality of tracks are defined, a motor for controllably positioning the head relative to the disc and an observer providing an estimated position and estimated velocity of the head, a method for moving the head from an initial track to a destination track comprising steps of:

(a) initiating a seek mode to move the head toward the destination track by applying current to the motor in relation to a current command signal indicative of a trajectory of the head; and (b) generating a modified current command signal as a sum of the current command signal and a settling current correction value determined in relation to the estimated position and the estimated velocity of the head at a predetermined distance from the destination track, where the motor applies current, in response to the modified current command signal, to settle the head onto the destination track.

2. The method of claim 1, wherein the settling current correction value is further determined in relation to a desired velocity and a desired position of the head at the predetermined distance from the destination track.

3. The method of claim 2, wherein the settling current correction value is provided by a settling table which selectively outputs the settling current correction value when the head reaches the predetermined distance from the destination track.

4. The method of claim 3, wherein the settling current correction value is characterized as a sum of a product of the estimated position of the head and a settling position gain value and a product of the estimated velocity of the head and a settling velocity gain value.

5. The method of claim 3, wherein the settling current correction value is further determined in relation to a position error signal indicative of a measured position of the head as the head is settled onto the destination track.

6. The method of claim 1, wherein the settling current correction value operates to add an additional zero to a response of the disc drive.

7. A disc drive comprising:

a head adjacent a rotatable disc on which a plurality of tracks are defined;

a motor, operably coupled to the head, which controllably positions the head in response to current applied to the motor; and a servo circuit, operably coupled to the head and the motor, which:

(a) applies current to the motor to move the head from an initial track and toward a destination track during a seek mode in response to a current command signal generated by the servo circuit indicative of the trajectory of the head during the seek mode; and (b) generates a modified current command signal as a sum of the current command signal and a settling current correction value determined in relation to an estimated position and an estimated velocity of the head when the head reaches a selected distance from the destination track, where the motor applies current, in response to the modified current command signal, to settle the head onto the destination track.

8. The disc drive of claim 7, wherein the servo circuit comprises:

an observer which generates the estimated position and velocity of the head; and a settling table, operably coupled to the observer, which outputs the settling current correction value in response to the estimated position and velocity of the head at the selected distance from the destination track.

9. The disc drive of claim 7, wherein the servo circuit comprises a programmable processing device having associated programming to settle the head onto the destination track.

* * * * *

UNITED STATES PATENT AND TRADEMARK OFFICE
CERTIFICATE OF CORRECTION

PATENT NO.   : 6,166,876
DATED        : December 26, 2000
INVENTOR(S)  : Zhiqiang Liu It is certified that error appears in the above-identified patent and that said Letters Patent is hereby corrected as shown below:

Column 8,
Formula 4, replace "$K_x = V_{ERR}$" with -- $K_x + V_{ERR}$ --.

Column 9,
Line 55, replace "of $U_A(k)$" with -- of $u_A(k)$ --.
Line 66, replace "state $X_d$ (i.e...)" with -- state $x_d$ (i.e... --.

Column 10,
Formula 9, replace "$L_e[y$" with -- $L_e[y$ --.
Line 16, replace "(8)" with -- (11) --.
Formula 18, replace "$M=zX...n=I$" with -- $M=zX...n=I...$ --.

Column 11,
Line 16, replace "$P_1$ and $P_2$" with -- $p_1$ and $p_2$ --.
Lines 21, 23 & 24, replace "$\Delta$ (such...
$\Delta$ (such...
$\Delta = 0.5...$"
with --      $\alpha$ (such...
$\alpha$ (such...
$\alpha = 0.5...$ --.

Column 12,
Line 21, replace "invention i(as..." with -- invention (as... --.

Signed and Sealed this

Thirteenth Day of August, 2002

Attest:

JAMES E. ROGAN
Attesting Officer                Director of the United States Patent and Trademark Office